(12) United States Patent
Djurle et al.

(10) Patent No.: US 7,536,843 B2
(45) Date of Patent: May 26, 2009

(54) METHOD AND SYSTEM FOR DOSING A PHARMACEUTICAL SAMPLE IN A PACKAGING MACHINE

(75) Inventors: Alf Djurle, Södertälje (SE); Reiner Wurst, Auenwald (DE)

(73) Assignee: AstraZeneca AB, Sodertalje (SE)

( * ) Notice: Subject to any disclaimer, the term of this patent is extended or adjusted under 35 U.S.C. 154(b) by 0 days.

(21) Appl. No.: 11/624,264

(22) Filed: Jan. 18, 2007

(65) Prior Publication Data

US 2007/0169836 A1 Jul. 26, 2007

Related U.S. Application Data

(60) Provisional application No. 60/761,320, filed on Jan. 23, 2006.

(51) Int. Cl.
*B65B 1/32* (2006.01)

(52) U.S. Cl. ............................. 53/502; 53/900; 141/9; 141/83; 141/100

(58) Field of Classification Search ............... 53/502, 53/900; 141/9, 100, 103, 104, 83; 177/56, 177/57, 70
See application file for complete search history.

(56) References Cited

U.S. PATENT DOCUMENTS

| | | | | |
|---|---|---|---|---|
| 4,402,349 A * | 9/1983 | Engert et al. | ............ | 141/9 |
| 4,431,070 A * | 2/1984 | Andrews | ............ | 177/102 |
| 4,525,071 A * | 6/1985 | Horowitz et al. | ............ | 366/141 |
| 4,678,046 A * | 7/1987 | Mosher | ............ | 177/1 |
| 5,038,839 A * | 8/1991 | Morimoto et al. | ............ | 141/83 |
| 5,052,811 A * | 10/1991 | Akatsu et al. | ............ | 366/141 |
| 5,092,413 A * | 3/1992 | Andrews | ............ | 177/56 |
| 5,515,740 A | 5/1996 | Gamberini | | |
| 5,665,941 A * | 9/1997 | Wehhofer et al. | ............ | 177/25.13 |
| 5,753,868 A * | 5/1998 | Diem | ............ | 177/70 |
| 5,971,037 A | 10/1999 | Ansaloni | | |
| 6,474,372 B2 * | 11/2002 | Sanderson et al. | ............ | 141/83 |
| 6,623,785 B2 * | 9/2003 | Childers | ............ | 427/2.14 |
| 2005/0175742 A1 | 8/2005 | Kornely et al. | ............ | 426/106 |
| 2005/0286340 A1 * | 12/2005 | Urquhart | ............ | 366/136 |
| 2007/0068959 A1 * | 3/2007 | D'Silva | ............ | 221/7 |

FOREIGN PATENT DOCUMENTS

| | | | |
|---|---|---|---|
| EP | 353197 A1 * | 1/1990 | |
| JP | 01199125 A * | 8/1989 | |
| WO | WO 2005/112868 A1 | 12/2005 | |

* cited by examiner

*Primary Examiner*—Stephen F Gerrity
(74) *Attorney, Agent, or Firm*—White & Case LLP

(57) ABSTRACT

The present invention relates to a method and system for dosing a pharmaceutical product in a packaging machine having at least one volumetric dosing unit with a dosing chamber. The system check-weighs the volumetrically dosed product with appropriate speed and is integrated into a filling or packaging machine. In accordance with the invention, a volume of a first pharmaceutical component is metered and weighed before being introduced into a package. The procedure is repeated with a second pharmaceutical component. The package containing the components is then weighed. Advantageously, accuracy and precision of the amount of the weighed components can be monitored with the present invention to secure the quality of the pharmaceutical product.

22 Claims, 3 Drawing Sheets

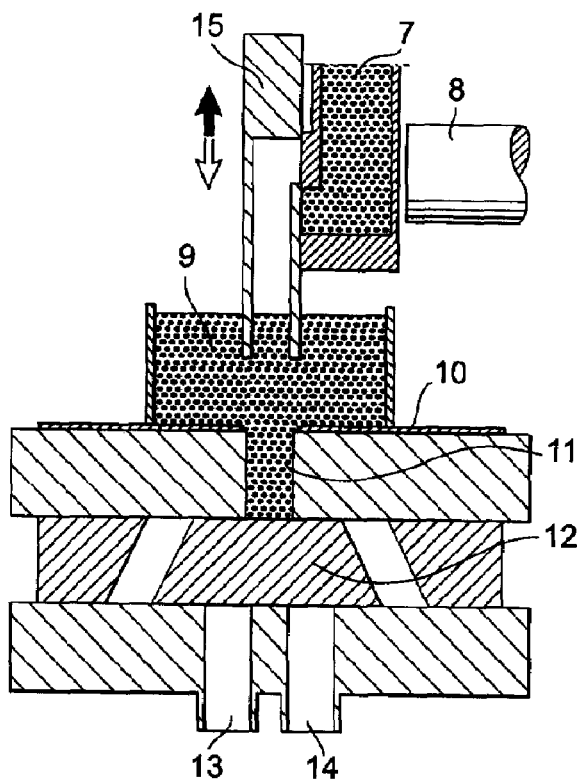
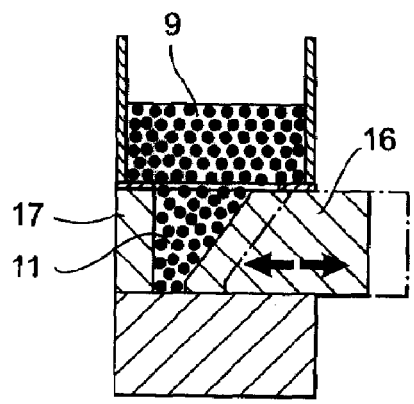
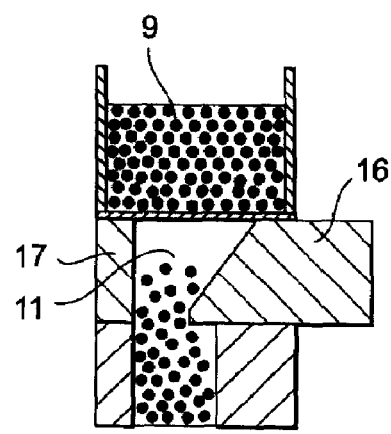

METHOD AND SYSTEM FOR DOSING A PHARMACEUTICAL SAMPLE IN A PACKAGING MACHINE

This application claims the priority benefit of U.S. Provisional patent application Ser. No. 60/761,320, filed on Jan. 23, 2006.

TECHNICAL FIELD

The present invention relates to a new method for dosing a pharmaceutical product in a packaging machine comprising at least one volumetric dosing unit with a dosing chamber provided with a first and a second slidable part. The pharmaceutical product comprises at least a first and a second component, the components typically being a portion of a pharmaceutical pellets and a portion of a powder, respectively.

The present invention further relates to a system for dosing a pharmaceutical product in a packaging machine comprising at least one volumetric dosing unit with a dosing chamber provided with a first and a second slidable part. The pharmaceutical product comprises at least a first and a second component. The system comprises a dosing unit for metering a volume of the components. The system further comprises means for introducing the said components into a package and means for weighing the components and the package.

BACKGROUND OF THE INVENTION

In the pharmaceutical industry, the accuracy of the metered doses of medicinal mixtures is of importance. These mixtures often contain active drug components that are harmful if the given dose is too high. On the other hand, the desired effect of the medicament is not achieved if the dose is too low.

The majority of pharmaceutical bulk products like powders, granulations and pellets are dosed volumetrically, due to process speed and cost effectiveness. By individually metering a volume of each dose before the dose is packaged, an accurate way of ensuring correct dosing is achieved.

Volumetric dosing can be performed by gravimetric feeding of the components to be dosed, or by forced feeding where, for example, one or more scrapers, rotating augers or rotating means making use of centrifugal force are used to feed medicament into a dosing chamber with a predetermined volume. To generate the correct dose, the volumetric dosing chamber is provided with slides opening and closing the dosing chamber during a cycle, for feeding and emptying the dosing chamber, respectively.

In some fields of pharmaceutical manufacturing 100% check-weighing is a common technology, where a filled package is check-weighed and the mean weight of the empty package (tare weight) is subtracted to calculate the fill-weight ("tare-gross-weighing"). This method providing an indirect weighing of the dose of medicament is often used when filling medicament in e.g. capsules. The capsules are weighed empty, then filled with medicament and then weighed again together with the contents. By subtracting the result of the first measurement from the second, an indirect indication of the weight of the medicament will be obtained.

This method of indirect weighing is also applicable for other packages, such as sachets. Thus, the sachet is weighed empty, then filled with the medicament, and then weighed again together with the contents, and the two measurements are subtracted for indirectly obtaining the weight of the medicament.

When the variance of the tare weight is equal to or greater than the target fill weight, the tare weights of the single receptacles have to be determined individually to calculate single fill weights. Further, when the tare weight of the receptacle is a multiple of the fill weight of the dose, the tare-gross-weighing approach is not applicable any more. For those cases, due to the relatively high preload of the receptacles, weighing cells with sensitivity and resolution appropriate for the dose to be weighed cannot be used. Further, this indirect weighing approach is not accurate enough when the weight of an active ingredient is considerably smaller than the weight of the package. The amount of active ingredient in a single dose might weigh as little as 1 mg, while the excipient with which they are to be mixed may weigh much more, in some cases up to a thousand times more, one or more grams.

However, the method of indirect weighing is not sufficient enough if high accuracy is needed since individual packages may vary in weight due to variations in, for example moisture content, surface weight and size.

Usually, medicaments contain one or more active ingredients to be mixed with in-active ingredients. In some cases, mixing of the components prior to filling the mixture in separate doses are not an alternative due to problem with segregation of the mixture during handling. This might be the case for example when mixing components with different properties, such as flow properties, density and/or particle-size. The result of mixing larger volumes before filling in separate doses might in those cases be an unreliable amount of active content in each dose. For those cases, there are methods of volumetrically dosing each and every component separately.

Volumetric dosing is in spite of the issues mentioned above widely used. By using well investigated formulations, balancing different needs it is possible to manage the issues mentioned. For pediatric formulations the issues with accuracy and precision is even more pronounced. These formulations require less active drug and the dosing accuracy requirements from a patient as well as legislative perspectives is as high as for other patient groups.

In contrast to dosing, where the dose normally is determined by metering a specific volume, pharmacopoeia requirements refer to mass, uniformity of mass and content uniformity (in % of mass).

When using volumetric dosing systems, mass of the dosed portion and uniformity of mass depend on precision of dose confinement and uniformity of product reservoir.

In the case of volumetric dosing of particles or pellets there are more to consider; changes e.g. in density, shape or particle size may lead to deviation in dosed weights, even if the metered volumes are the same.

Further, if the dose to be metered decreases compared to the size of the particles, or the pellets, the contribution from each individual particle or pellet increases. A normal dosing range constitutes 1000-10 000 particles or pellets. In formulations with less than 500 particles or pellets the experience is that those will generate an uncertainty of accuracy and precision in dosage content (precision of target weight) and content uniformity (high relative standard deviations).

In those cases, it is therefore appropriate to further control the dosing process, i.e. single weights and dose uniformity, by statistical IPC or by a 100% check-weighing. The weighing results are used to adjust the dosing system, thus minimizing rejects.

An example where indirect weighing is not accurate enough is when a small amount of pellets, in the range of 5 mg to 500 mg, have to be filled into sachets with tare weight of one to several grams.

THE OBJECT OF THE INVENTION

The object of the present invention is in a first aspect to provide a method and a system for dosing a pharmaceutical product, overcoming the disadvantages discussed above. To overcome the problems mentioned above, the product to be filled is check-weighed before delivery into a package. The system check-weighs the volumetrically dosed product with appropriate speed and is integrated into a filling or packaging machine.

SUMMARY OF THE INVENTION

The present invention relates to a method for dosing a pharmaceutical product. The method is used in a packaging machine comprising at least one volumetric dosing unit with a dosing chamber. The pharmaceutical product comprises at least a first and a second component. The method comprises metering a volume of the first component and weighing the metered volume of the first component. Thus, the confined dose of the first component, for example being pellets, is check-weighed on line. Further, the method comprises introducing the metered and check-weighed volume of the first component into a package, metering a volume of the second component, introducing the metered volume of the second component into the package, weighing of the package into which the components have being introduced.

By weighing the metered volume of the first component, the amount of the first component for each dose is secured with very high accuracy. Thus, one of the advantages with the present invention is that the accuracy and precision of the amount of the weighed components can be monitored and the result used to secure the quality of the pharmaceutical product.

In one embodiment, the dosing chamber is provided with a first and a second slidable part.

In another embodiment, the method comprises sealing the package after introducing the first and second components and before weighing the package. The sealing procedure performed before the weighing of the package with it contents secures that the quantity to be weighed is not affected by any further processing, or that the content in the package, and thus the weight, is affected by environmental factors before weighing, such as mechanical handling or moisture.

In yet another embodiment the method comprises weighing of the second component after metering the volume of the second component and before introducing the second component in the package. The advantage of this is that the accuracy and precision of direct weighing is used and that the weight of the packaging material does not interfere with the weighing of the second component.

In yet another embodiment, in the case that the pharmaceutical product comprises more than two components, the method comprises weighing at least two of the components after metering the volume of said at least two components, and before introducing the components in the package. The advantage of this is that the accuracy and precision of direct weighing is used and that the weight of the packaging material does not interfere with the weighing of any of the components weighed before filling into the package.

In yet another embodiment the method comprises using at least one of the results from the weighing procedures in a feed-back loop regulation of the volume metering of the pharmaceutical components. By the use of a feed-back loop, the volume defined in the volumetric dosing chamber is adjusted to ensure that the weight of the amount of the component filled in the dosing chamber equals the target weight. Thus, the risk that a patient is given a dose with too high, or too low, dose is minimized.

In yet another embodiment, the method comprises intermittent feed-back loop regulation of the volume metering of the pharmaceutical components during operation of said packaging machine. By intermittent use of the feed-back loop, the process is allowed to stabilize between each adjustment and the manufacturing process will be easy to stabilize.

In yet another embodiment, the method comprises continuous feed-back loop regulation of the volume metering of the pharmaceutical components during operation of said packaging machine. With the use of a continuous feed-back loop, regulation will react on quick events and trends and the process will be adjusted quickly to meet the target weight in spite of these. The amount of product that has to be discarded due to dose outside the dose interval is by this procedure minimized.

In yet another embodiment, the method is performed in the case that the weight of the first pharmaceutical component is significantly less than the weight of the second pharmaceutical component. It is possible to accurately determine the weight of the first component when using the invention.

In yet another embodiment, the weight ratio between the first and the second pharmaceutical components is more than 1:10.

In yet another embodiment the weight ratio between the first and the second pharmaceutical components is more than 1:100.

In yet another embodiment, the volume of the first pharmaceutical component is significantly smaller than the volume of the second pharmaceutical component.

In yet another embodiment, the volume ratio between the first and the second pharmaceutical components is more than 1:10.

In yet another embodiment, the volume ratio between the first and the second pharmaceutical components is more than 1:100.

In yet another embodiment, the pharmaceutical product is introduced into sachets. For sachets, the variations in properties, i.e. weight, may vary a lot between individual sachets. By the use of the method, the influence of said variations is minimised.

In yet another embodiment, the said sachets are made of aluminium foil.

In yet another embodiment, the pharmaceutical product is introduced into blister packages.

In yet another embodiment, the pharmaceutical product is introduced into capsules. For capsules, the variations in properties, i.e. weight, may vary between individual capsules. By the use of the method, the influence of said variations is minimised.

In yet another embodiment, the at least one of said components is pellets.

In yet another embodiment, the at least one of said components is powder.

In yet another embodiment, the at least one of said components is granulate.

The inventions further relates to a system for dosing a pharmaceutical product in a packaging machine comprising at least one volumetric dosing unit with a dosing chamber provided with a first and a second slidable part. The pharmaceutical product comprises at least a first and a second component. The system for dosing comprises a first dosing unit for metering a volume of the first component, and a second dosing unit for metering a volume of the second component. Further, the system comprises means for introducing the components into a package and means for weighing the package and the components.

The means comprises a first weighing unit for weighing the package and the components, and a second weighing unit for weighing the first component after metering the first component by volume and before introducing the first component into the package.

In another embodiment, the system comprises means for sealing the said package.

In yet another embodiment, the system comprises a third weighing unit for weighing the second component after metering the second component by volume and before introducing the second component into the package.

In yet another embodiment, the system comprises means for feed-back loop regulation of the volume metering of the components. The means for feed-back loop regulation uses at least one of the results from the weighing procedures.

In yet another embodiment, the means for feed-back loop regulation are arranged to perform intermittent regulation of the volume metering of the pharmaceutical components during operation of said packaging machine.

In yet another embodiment, the means for feed-back loop regulation are arranged to perform continuous regulation of the volume metering of the pharmaceutical components during operation of said packaging machine.

The invention further relates to a package containing a pharmaceutical product comprising at least a first and a second component, wherein each component has been dosed in accordance with the method of the present invention.

The invention still further relates to a method for producing a package containing a pharmaceutical product comprising at least a first and a second component, wherein each component has been dosed in accordance with the method of the present invention.

BRIEF DESCRIPTION OF THE DRAWINGS

FIG. 5 shows the claimed system in a closed state when pellet feeding is interrupted by closure valve 15 to run empty and disassemble the dosing unit without loss of pellets.

FIGS. 6a and 6b are sideviews of the dosing unit according to the present invention.

DETAILED DESCRIPTION OF PREFERRED EMBODIMENTS

Figure 1:
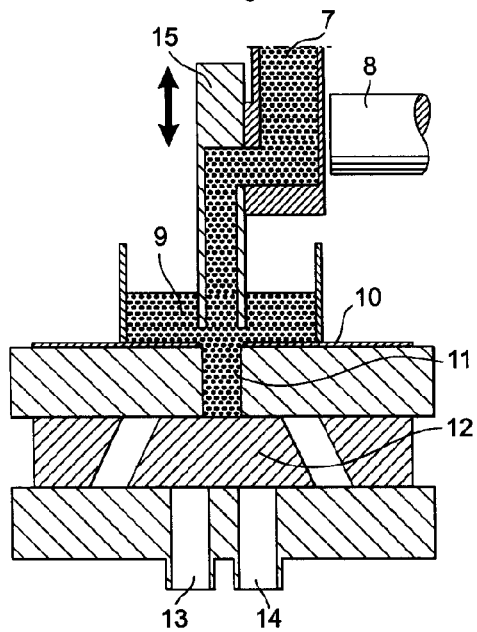
FIG. 1 shows part of a system for volumetric dosing according to the present invention. The system comprises a first dosing unit comprising an adjustable dosing chamber 11 confined by a first slidable part, the feeding slide 10 and a second slidable part, the discharge slide 12

FIG. 1 shows part of a system for volumetric dosing according to the present invention. The pharmaceutical product to be dosed comprises at least a first and a second component. The system comprises a first dosing unit comprising an adjustable dosing chamber 11, confined by a first slidable part, the feeding slide 10, and a second slidable part, the discharge slide 12. The dosing unit further comprises an adjustable chamber wall 16 and a chamber wall 17 (see FIG. 6a, b) attached to the discharge slide 12. The dosing unit is used for metering a volume of the first component, in the figure shown as pellets.

The system comprises a first weighing unit for weighing the package, together with the components, after the components have been introduced into the package. Thus, the final package is check-weighed to control the total fill weight. The system further comprises a second weighing unit for weighing the first component after it has been metered by volume. Every single dose of the first component is check-weighed by the second weighing unit before delivery into a primary package receptacle.

In the system, the dose of the first component, in the figures shown as pellets, is confined by means of a volumetric dosing system, consisting of a pellet feeding unit with a feeding tube 7, having a closure valve 15, a level sensor 8 and an intermediate pellet hopper and the dosing unit described above.

The pharmaceutical formulations used together with the invention can comprise an acid sensitive proton pump inhibitor or an alkaline salt thereof or a single enantiomer or an alkaline salt of its enantiomer as active ingredient. The single enantiomers, racemic mixtures (50% of each enantiomer) and unequal mixtures of the two enantiomers are suitable for the pharmaceutical formulation according to be used with the present invention.

The active ingredient is being comprised optionally together with excipients, in small enteric coated pellets/beads.

Compounds/active ingredients of interest for the pharmaceutical compositions in question are compounds of the general formula I, an alkaline salt thereof, one of the single enantiomers thereof or an alkaline salt of one of the enantiomers

I wherein

Het$_1$ is

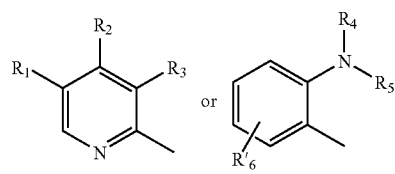

Het₂ is

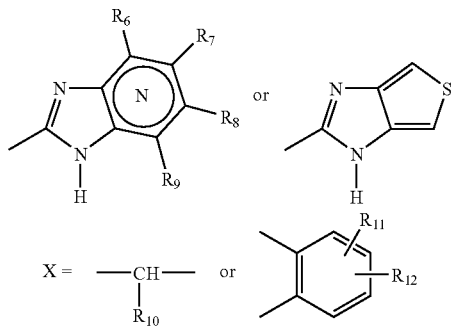

wherein

N in the benzimidazole moiety means that one of the ring carbon atoms substituted by R₆-R₉ optionally may be exchanged for a nitrogen atom without any substituted;

$R_1$, $R_2$ and $R_3$ are the same or different and selected from hydrogen, alkyl, alkoxy optionally substituted by fluorine, alkylthio, alkoxyalkoxy, dialkylamino, piperidino, morpholino, halogen, phenyl and phenylalkoxy;

$R_4$ and $R_5$ are the same or different and selected from hydrogen, alkyl and arylalkyl;

$R_6$' is hydrogen, halogen, trifluoromethyl, alkyl or alkoxy;

$R_6$-$R_9$ are the same or different and selected from hydrogen, alkyl, alkoxy, halogen, halo-alkoxy, alkylcarbonyl, alkoxycarbonyl, oxazolinyl, pyrrolyl and trifluoroalkyl, or adjacent groups $R_6$-$R_9$ form ring structures which may be further substituted;

$R_{10}$ is hydrogen or forms an alkylene chain together with $R_3$ and $R_{11}$ and $R_{12}$ are the same or different and selected from hydrogen, halogen and alkyl.

In the above definitions alkyl groups, alkoxy groups and moieties thereof may be branched or straight $C_1$-$C_9$-chains or comprise cyclic alkyl groups, for example cycloalkylalkyl.

Examples of specifically interesting compounds according to formula I are (Ia)

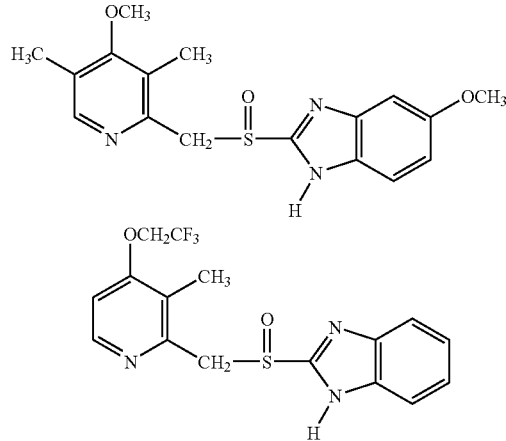

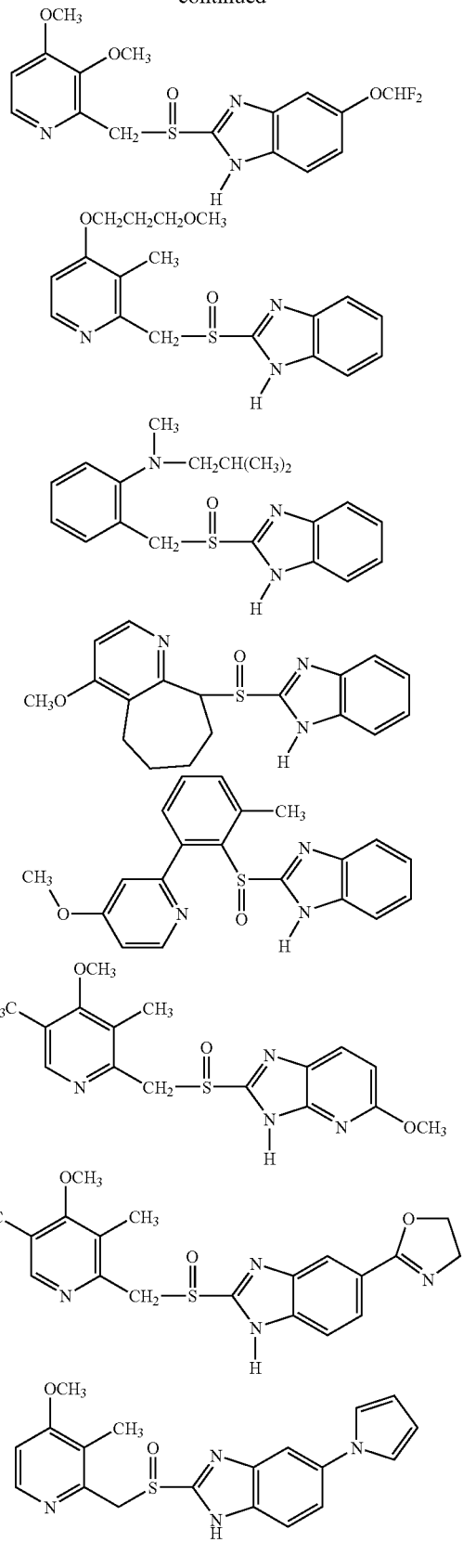

including tautomeric forms thereof.

Preferred compounds for the pharmaceutical preparation used with the present invention are omeprazole, a magnesium salt of omeprazole or a magnesium salt of the (−)-enantiomer of omeprazole. The latter having the generic name esomeprazole. The active ingredient can for example be esomeprazole magnesium trihydrate, or tenatoprazole or a pharmaceutically acceptable salt thereof, or a single enantiomer of either of them, being the active drug.

As another example, the compound/active ingredient can be a hydrated form of anyone of the aforementioned compounds/active ingredients.

The amount of active ingredient in the preparation is in the range of 1 mg-100 mg, 2 mg-80 mg or 5 mg-50 mg.

A second dosing unit is provided for metering a volume of the second component. Further, means for introducing the components into the package receptacle are provided.

The shown system is to be used with a packaging machine for filling sachets with pellets and at least one additional component, i.e. a recipient in the form of a powder. The shown system allows for 100% determination of net fill weight, independent on tare weights of the primary packaging receptacles, and uses optimized adjustable dosing chamber 11 with feeding and discharge slides 10, 12. The system uses a direct gravimetric mass determination (e.g. a weighing cell). The system is protected against influences by any machine vibrations or air turbulences.

The system can be run with production speed appropriate for pharmaceutical industry. The fill weight is determined down to less than 10 mg with appropriate accuracy. The system shown in the figures uses gravimetric force to convey pellets through the system. Feed back to the volumetric dosing system permits the system to adjust the dosing volume. Defective packages are identified and rejected.

As shown in FIG. 1, when the dosing cycle has started, the upper part of the dosing chamber 11 is opened by sliding the first slidable part, the feeding slide 10, to its opened position. The first component, the pellets, are introduced into the dosing chamber 11 by means of gravity through the opening in the feeding slide 10. The first component may be fed into the dosing chamber 11 by gravity, or by force. In the figure, gravimetric feed is shown. The metered dose will depend on the position of the adjustable chamber wall 16.

Figure 2:
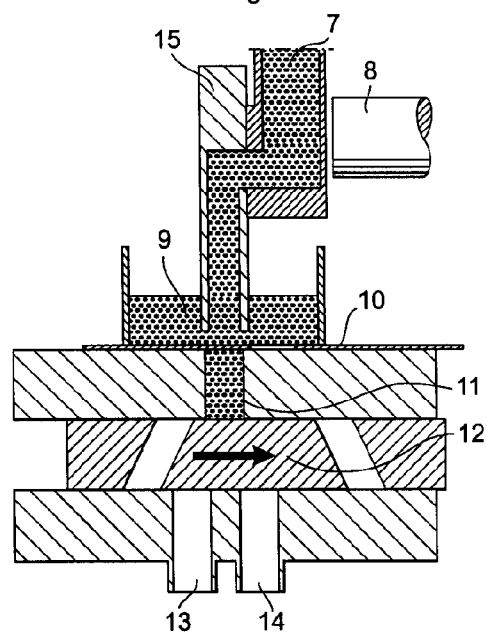
FIGS. 2 and 3 illustrate the confinement of a dose according to the method and system of the present invention whereby movement of the feeding slide 10 closes the dosing chamber 11. Simultaneously, the discharge slide 12 is moved in the direction of the arrow to open the dosing chamber 11 and release the dose into a first discharge tube 13 connected to the transfer tube 1.
Figure 3:
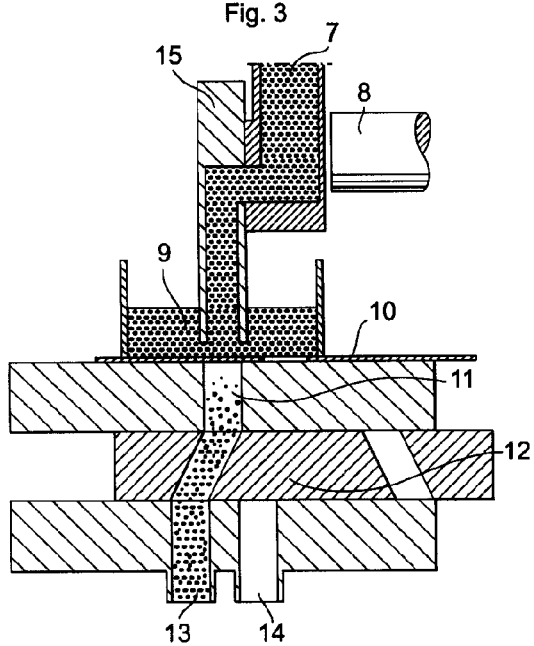

As shown in FIGS. 2 and 3, confinement of the dose is achieved by movement of the feeding slide 10, which will close the dosing chamber 11. Simultaneously, the discharge slide 12 is moved in the direction of the arrow to open the dosing chamber 11 and release the dose into the first discharge tubes 13 connected to the transfer tube 1. The functionality of this pellet dosing system is characterised by the advantage that the feeding slide 10, the discharge slide 12 and the moving chamber wall 17 are fixed to each other and thus can be moved by one single drive only.

Figure 4:
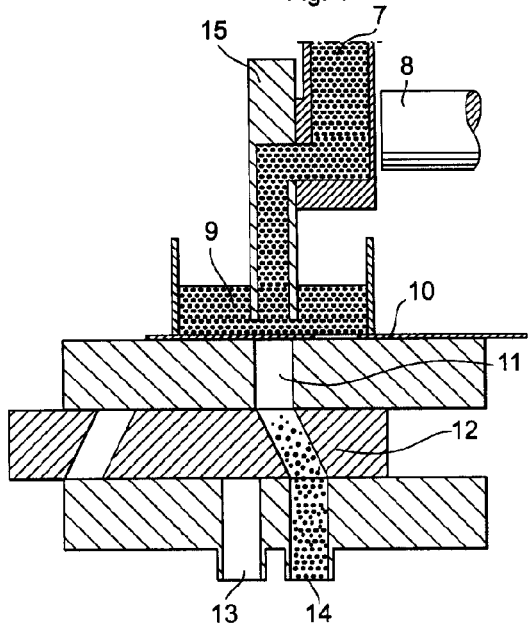
FIG. 4 illustrates movement of discharge slide 12 in an opposite direction to release the dose into a second discharge tube 14.

In FIG. 4, the discharge slide 12 is moved in the other direction to release the dose into the second discharge tube 14.

The pellet feeding can be interrupted by a closure valve 15, e.g. to run empty and disassemble the dosing unit without loss of pellets. The interrupted, closed state of the system is shown in FIG. 5.

FIGS. 6a and 6b are sideviews of the dosing unit. In FIG. 6a the dosing chamber 11 has been filled via the pellet hopper 9 and then closed by the feeding slide 10. The volume of the dosing chamber 11 is determined by the position of the adjustable wall 16, movable in the direction of the arrows.

In FIG. 6b the discharge slide 12 has been moved aligned to one of the discharge tubes 13, 14 to empty the dosing chamber 11.

Figure 7:
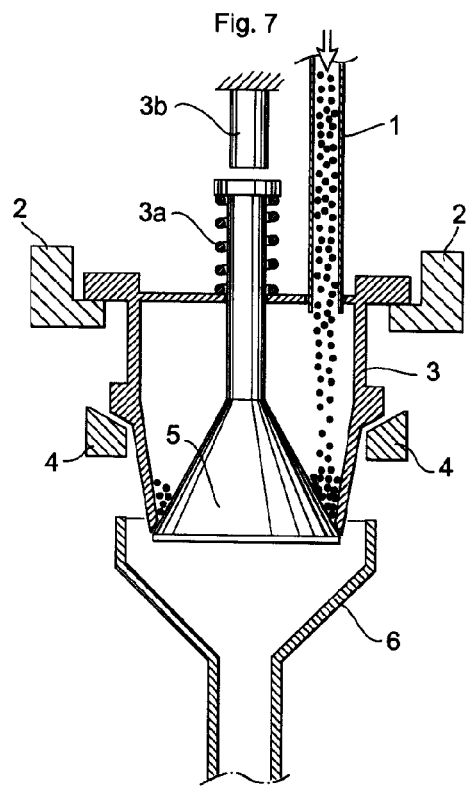
FIG. 7 illustrates the transfer of a metered dose of pellets through a transfer tube 1 to a weighing receptacle 3 according to the present invention.

As shown in FIG. 7, the metered dose of pellets is transferred through a transfer tube 1 to a weighing receptacle 3. During the feeding phase of the pellet portion the weighing receptacle 3 is fixed by a lifting device 2. The conical discharge opening of the weighing receptacle 3 is closed by spring force 3a when the pellets are transferred into it.

Figure 8:
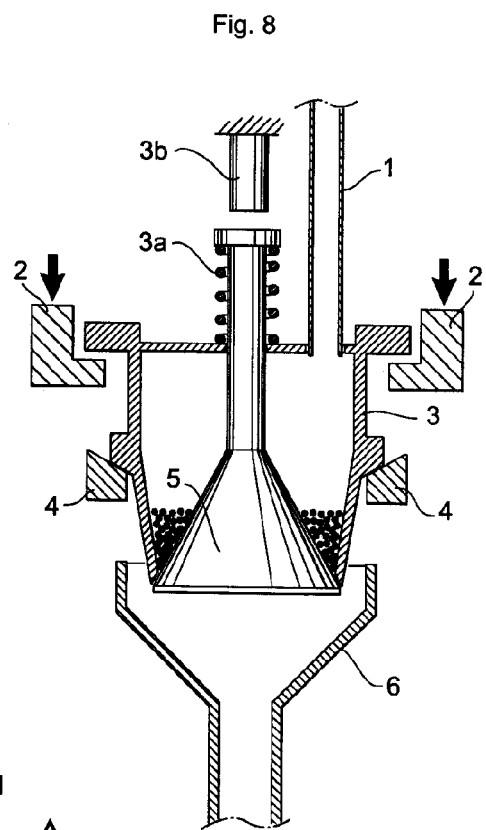
FIG. 8 shows the position of the weighing receptacle 3 when the weight (=mass) of the contained pellets is determined.

As shown in FIG. 8, when having received the by volume premetered pellet portion, the weighing receptacle 3 moves down on to the load cell 4 where it has no contact with the lifting device 2. In this position the weight (=mass) of the contained pellets is determined by subtracting the tare weight of the weighing receptacle 3, which has been determined very exact before filling.

Figure 9:
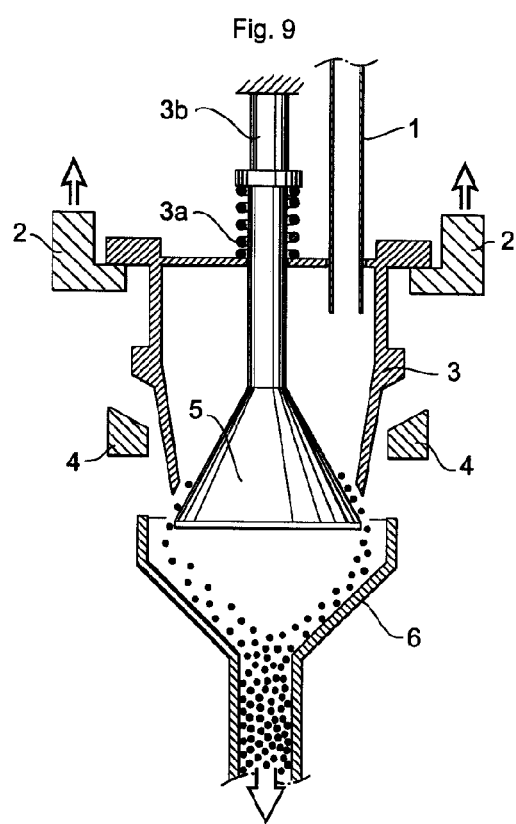
FIG. 9 illustrates release of a pellet portion from the weighing portion 3 after weighing and transfer by gravity of the released pellet portion into a transfer funnel 6 leading to a package, e.g., a sachet.

The following step is shown in FIG. 9, where the weighing receptacle 3 is lifted up by the lifting device 2, contracting the spring 3 until the shaft of the discharge cone 5 is brought in contact with the backstop 3b. By this, the discharge cone 5 is pushed downwards to open the weighing receptacle 3 and release the pellet portion. The pellets are transferred by gravity into a transfer funnel 6 which will lead them into the sachets as primary packaging.

The check-weighing cycle is terminated by lowering the weighing receptacle 3 to the feeding position, whereby the weighing receptacle 3 is closed again.

To increase machine output, the pellets are check-weighed alternately by two weighing cells in parallel, which are supplied by a dosing chamber 11 and will discharge the pellets on to the same sachet position.

The weighing cells are protected by a special cover to keep off air turbulences caused by the product and the packaging machine.

Sachets with incorrect fill weight are rejected in the course of the process.

The dosing chamber 11 is readjusted by a feed back loop automatically on basis of the mean fill weight.

The invention claimed is:

1. A method for dosing a pharmaceutical product contained in a packaging machine, wherein:
    the machine comprises at least one volumetric dosing unit with a dosing chamber and at least one on-line check-weighing unit;
    the pharmaceutical product comprises at least a first component and a second component; and
    at least one of the components comprises an active ingredient,
    the method comprising the steps of:
    metering a volume of the first component with the dosing unit;
    weighing the metered volume of the first component with the weighing unit;
    introducing the metered and weighed volume of the first component into a package;
    metering a volume of the second component with the dosing unit;
    introducing the metered volume of the second component into the package; and
    weighing the package containing the first and second components.

2. The method according to claim 1, wherein the dosing chamber has a first slidable part and a second slidable part.

3. The method according to claim 1, further comprising the step of weighing the metered volume of the second component before the second component is introduced into the package.

4. The method according to claim 3, wherein the weight of the metered volume of the first component is significantly less than the weight of the metered volume of the second component.

5. The method according to claim 4, wherein the weight ratio between the metered volume of the first and the second components is more than 1:10.

6. The method according to claim 4, wherein the weight ratio between the metered volume of the first and the second components is more than 1:100.

7. The method according to claim 1, further comprising the step of sealing the package containing the first and second components before the package is weighed.

8. The method according to claim 1, wherein the pharmaceutical product comprises more than two components, and wherein the method comprises weighing a metered volume of at least two of the components before introducing the components into the package.

9. The method according to claim 1, further comprising the step of using the results from the step of weighing the metered volume of the first component in a feed-back loop regulation of the volume metering of the first component.

10. The method according to claim 9, wherein the feed-back loop regulation is intermittent.

11. The method according to claim 9, wherein the feed-back loop regulation is continuous.

12. The method according to claim 1, wherein the metered volume of the first component is significantly smaller than the metered volume of the second component.

13. The method according to claim 12, wherein the volume ratio between the first and the second components is more than 1:10.

14. The method according to claim 12, wherein the volume ratio between the first and the second components is more than 1:100, 15. The method according to claim 1, wherein the package is a sachet.

16. The method according to claim 15, wherein the sachet is made of aluminum foil.

17. The method according to claim 1, wherein the package is a blister package.

18. The method according to claim 1, wherein the package is a capsule.

19. The method according to claim 1, wherein at least one of the components is in the form of pellets.

20. The method according to claim 1, wherein at least one of the components is a powder.

21. The method according to claim 1, wherein at least one of the components is in the form of granules.

22. A method for producing a package containing a pharmaceutical product comprising at least a first and a second components, wherein the method comprises:
   dosing the components according to the method of claim 1 into the package; and
   sealing the package.

* * * * *